United States Patent [19]
Potterveld et al.

[11] Patent Number: 5,787,437
[45] Date of Patent: Jul. 28, 1998

[54] METHOD AND APPARATUS FOR SHARED MANAGEMENT INFORMATION VIA A COMMON REPOSITORY

[75] Inventors: Robert A. Potterveld, Fort Collins; Thomas G. Bartz, Loveland, both of Colo.

[73] Assignee: Hewlett-Packard Company, Palo Alto, Calif.

[21] Appl. No.: 741,152

[22] Filed: Oct. 29, 1996

[51] Int. Cl.[6] ................................................ G06F 17/30
[52] U.S. Cl. ........................ 707/103; 707/100; 707/104
[58] Field of Search ............................ 395/601–9, 614; 707/103

[56] References Cited

U.S. PATENT DOCUMENTS

| | | | |
|---|---|---|---|
| 5,295,256 | 3/1994 | Bapat | 395/614 |
| 5,307,484 | 4/1994 | Baker et al. | 395/600 |
| 5,550,971 | 8/1996 | Brunner | 395/600 |
| 5,596,745 | 1/1997 | Lai | 395/614 |
| 5,659,735 | 8/1997 | Parrish | 395/610 |

OTHER PUBLICATIONS

HP OpenView Meta–Schema Definition Working Draft, by Hewlett Packard, pp. 1–22, Jul. 1994.
Johnson Trisha, "HP Open View Meta–Schema Definition Working Draft," Hewlett–Packard Co., Jul. 11, 1994.
Klemba, K. & Kosarchyn, M., A Model For Object Relationship Management.: Hewlett–Packard Co., Date Unknown.
Object Management Group, Inc., "Joint Object Services Submission—Relationship Service Specification," OMG TC Document 94.5.5, May 30, 1994.

Primary Examiner—Thomas G. Black
Assistant Examiner—Diane D. Mizrahi

[57] ABSTRACT

A method and associated data constructs for sharing management information, stored in a common repository among multiple application programs. The present invention provides methods and structures for maintaining consistency and integrity of information shared among multiple application programs while allowing easier integration of management information relating to disparate aspects of enterprise management. Standard server programs are provided to serve client application programs by manipulating and retrieving information stored in the common repository. A meta-schema defines the structure of information stored in the common repository and permits extension of the information to incorporate data relevant to new application programs. In addition, tools are defined to permit developers to automate the creation of new server programs which manipulate and retrieve information stored in the common repository. The automatic generation of new server programs helps retain the consistency and integrity of management information achieved by application of the meta-schema structures.

13 Claims, 10 Drawing Sheets

METHOD AND APPARATUS FOR SHARED MANAGEMENT INFORMATION VIA A COMMON REPOSITORY

BACKGROUND OF THE INVENTION

1. Field of the Invention

The present invention relates to the field of enterprise management systems and in particular to a computer based, object oriented common repository for the storage of information managed by enterprise management servers on behalf of application program clients.

2. Description of the Related Art

Management systems utilized in an enterprise frequently apply computing systems to automate aspects of the enterprise management. Enterprise management, as used herein, relates to the management of any objects used by the enterprise, and the various attributes of, and associations between, the objects. Enterprise management encompasses many different aspects of objects within an enterprise. Enterprise management application programs in the past have managed a specific aspect of the entire enterprise management task. For example, some applications are concerned with topological information regarding objects in the enterprise (also referred to as relationship information). Another typical application program is concerned with attribute information regarding objects in the enterprise. An inventory control program is exemplary of an application program concerned with attributes (inventory count) of managed objects. Other application programs are concerned with trend information regarding objects in the enterprise. Yet other application programs manage events and historical attribute information regarding objects in the enterprise.

It is desirable that the information managed by a management application program be:

available—open to other applications and end users consistent—the structure of managed information is well known and easy to manipulate accurate—has integrity, is accurate, and is meaningful In prior designs it is common to achieve the latter two goals above, namely consistency and accuracy, by sacrificing, in part, the availability of the information. Restricting the use of the stored information by other application programs or by end users helps assure the accuracy and consistency of the information managed by a particular application program. It is common in prior designs that each application program creates and manages its own data structures for representing, storing, and retrieving the information manipulated by the application program (typically with the aid of database management subsystems). Each specific application program is therefore independent of all other application programs.

A first problem with the design of independent application programs for each management task arises in the wasted, often redundant, effort to create each management application program. In the prior designs, it would be required that independent development groups, possibly representing independent vendors, agree to integrate their respective application programs at some early point in their design phase. Even if such cooperation were common in competing vendor relations, the time schedules associated with development efforts of different vendors may not overlap sufficiently to permit effective cooperation between the respective development groups.

Similar application integration problems may arise even where independent application programs are developed by a single group. Frequently the various management application programs are developed over a span of time. Each application program tends to develop its own unique structures and methods for representing the managed objects. This redundant development effort may increase the complexity and related costs for development of such management application programs.

Therefore, second problem with the design of disparate management application programs arises in the difficulty of integrating the information managed by potentially several independent application programs. In view of independent development efforts such as described above, the variety of independently developed structures and methods for representing managed objects tends to lead toward incompatible designs which may be difficult to integrate. The isolated management application program, such as described above and common in prior designs, is adequate for a manager or management task isolated from other management issues. However, when an operator or manager requires the integration of information from several different aspects of the enterprise, the isolated, disparate application programs, typical in prior designs, are incapable of providing an integrated view of the objects stored in their respective databases. The integration of information often becomes a manual process left to the mangers using the applications. The disparate application programs cannot easily integrate the information managed by other application programs.

A third problem with the use of disparate systems for different management tasks utilizing common elements of information arises in the inevitable duplication of stored information and resulting loss of data integrity. Since each of the disparate management tasks typically is associated with its own unique format and structure for storage of information, it is common that similar information is duplicated in the information storage of several management application. For example, one management application may require information regarding an employee with respect to payroll issues, while another application may store information regarding the same employee useful to business travel planning. Both management applications may need access to common information such as office mail stop and phone extension, etc. Both disparate management applications may therefore store this common information for use in different operations (i.e. payroll deposits or travel scheduling).

This duplication of stored information increases the aggregate storage capacity needs of the enterprise. More importantly, when such common information is modified, (i.e. the employee moves to a new office mail stop), the information may be updated in one application but not another. Such potential inconsistencies in information managed by enterprise management applications creates problems for information managers. Each disparate management application must take responsibility for updating its own stored version of all common elements of information. As discussed above, each independent application program attempts to assure accuracy and integrity of managed information by limiting the accessibility of the managed information to other applications. The disparate application programs attempt to maintain the data integrity of their private copies of common data by restricting any possibility for access by other application programs. However, when viewed more broadly as an enterprise wide collection of managed information, the above described inconsistencies between duplicate copies of related data reduces the overall integrity of the enterprise store of information.

An enterprise could attempt to initially integrate all possible enterprise information management subsystems early in their design phases to avoid such information duplication problems. Such planning could produce a totally integrated, enterprise wide, information storage base which can avoid unnecessary duplication of stored data. Clearly, regardless of the degree of planning applied to the initial design of an integrated management information storage base, the need for new management information applications will arise. Such new applications will require significant re-design of the initially integrated information base. This requires significant efforts to re-design the information storage base. The re-design effort frequently requires the resources of a centralized management information technology group coordinating the required changes to maintain the desired information integration. Such centralized integration control based and human re-design intervention is inconsistent with the evolving de-centralization of data processing resources within an enterprise.

From the above discussion it can be seen that there exists a need for improved information storage and retrieval methods for enterprise management application programs.

SUMMARY OF THE INVENTION

The present invention solves the above identified problems to thereby advance the art by providing for a common repository of information which is shared by management information system application programs. The methods and data constructs of the present invention present an application programming interface (hereinafter referred to as API) used by application program developers to provide a common structure for stored information and to reduce duplication of information utilized by multiple application programs.

The methods and data constructs of the present invention store information in such a manner as to permit reuse and sharing of information among several application programs. A portion of the data constructs manipulated by the methods of the present invention stores an object identifier which uniquely identifies an object provided to the methods of the present invention. The objects so identified are initially provided to the present invention by application programs using the shared common repository. Other information stored with the object identifier serves to provide common information in a predefined structure which is known to and usable by other application programs.

A server program is associated with each usage of the information stored in the common repository. The server programs provide an API standard for application programs to utilize the shared data in the common repository. For example, the topology management service (also referred to as a relationship management service), disclosed in co-pending U.S. patent application Ser. No. HPDN 1094626, provides management information relating to topological associations (also referred to herein as "associations") among stored objects. Other standard servers are defined to provide object attribute information (such as inventory data), trend and event related information, as well as historical attribute information. The use of a server program API for each managed aspect of objects stored in the common repository improves data integrity by enforcing rules, embedded within the server, which define legal operations on the objects managed by the server.

Methods and structure within the scope of the present invention also provide tools to aid in the development of new server programs. A meta-schema is used to define rules for creating new databases stored within the common repository. Other methods utilize the meta-schema in conjunction with developer directions to generate server program source code. The program generator feature of the present invention creates a functional server which is integrated with other defined servers through the rules of the meta-schema to permit simpler sharing of information. Application programs may then be designed by the developer to utilize the API interface for each server to manipulate information stored in the common repository. The collection of server programs, integrated by the common definition of the meta-schema used in creating the servers, permits application programs to easily integrate information managed by several server programs.

The storage of all information in the common repository, managed by the integrated server programs, also permits reduction of duplicated information stored in common repository. Since all information for the enterprise management is in a single repository, methods of the present invention can enforce rules which reduce the unintended duplication of information.

The present invention manages the common repository utilizing a standard API independent of the specific database management engine (also referred to herein as database management means) which manages the physical storage of the information on storage media. The structure and methods of the present invention are built upon open standard database APIs (also referred to herein as database management interface means) such as Microsoft® ODBC or X/Open® DATA MANAGEMENT: SQL CALL LEVEL INTERFACE (X/Open® Preliminary Specification P303 ISBN 1-85912-015-6—was previously publication S203—will become publication C451 available from X/Open Company Ltd, Berks, United Kingdom). These standards permit the server programs of the present invention to utilize any underlying database engine which conforms to these standards for the permanent physical storage of the managed information. End user installations using the present invention may therefore utilize any presently installed database management subsystem Numerous other features, objects and advantages of the present invention will become apparent from the following description when read in conjunction with the accompanying drawings.

DETAILED DESCRIPTION OF THE PREFERRED EMBODIMENT

The present invention comprises an application program interface (API) for server programs which manage objects in a common repository on behalf of client application programs. In addition, the present invention comprises a meta-schema which defines standard data constructs and associated tools for automating the construction of server programs to manage new aspects of objects in the common repository.

Figure 2:
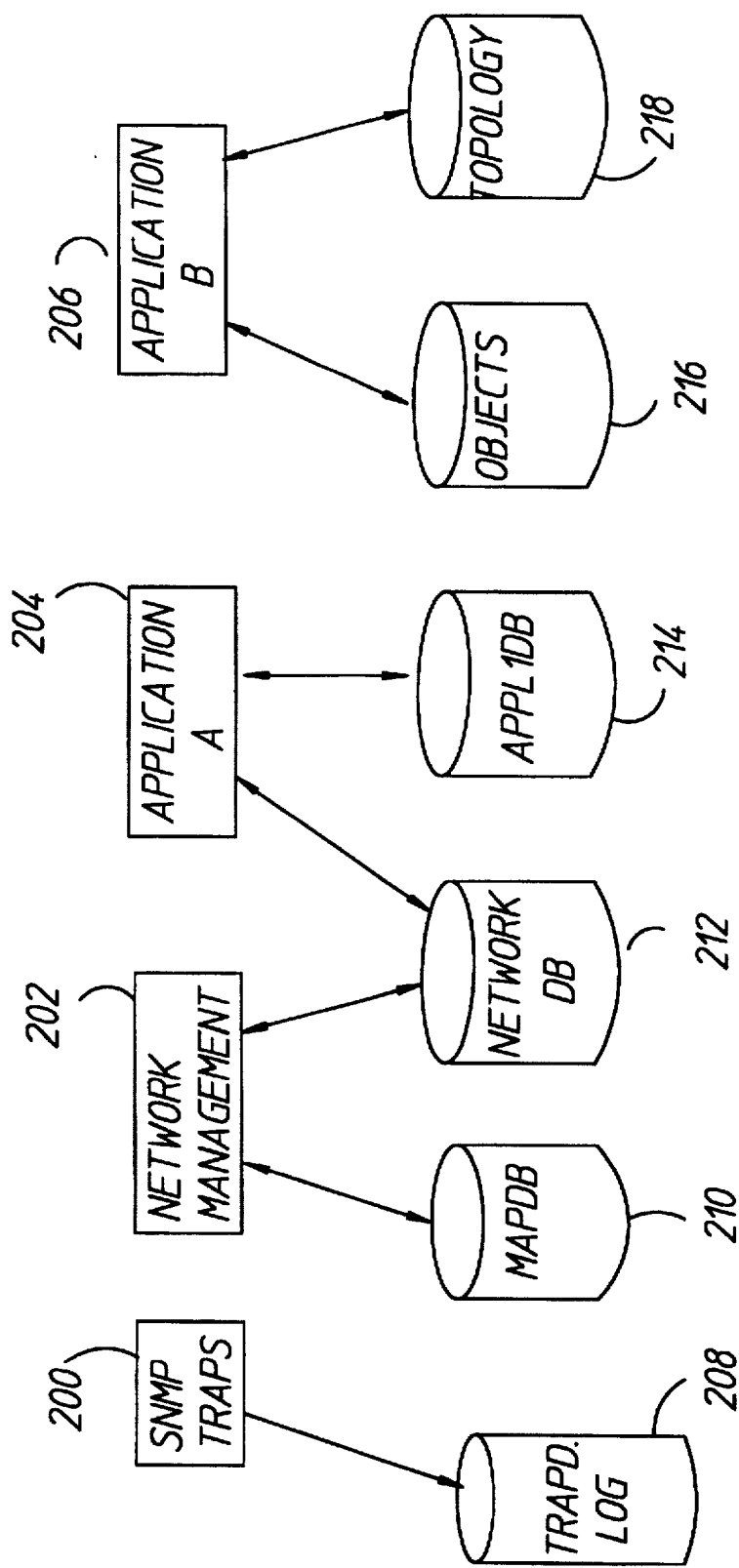
FIG. 2 shows an overview of the structure of application programs, typical of prior designs, each of which manages its own information structure as a private database.

FIG. 2 provides an overview of typical methods applied by prior designs for enterprise management. Each distinct enterprise management task is designed with a customized application program. Each application program typically had its own database providing information and associated structure as appropriate to the specific application. As shown in FIG. 2, four disparate application programs 200, 202, 204, and 206 are designed to manage various aspects of an enterprise. Each application is shown to interact with its own database structures 208 through 218. SNMP TRAPS 200 is an application program which, for example, manages event related information by logging Simple Network Management Protocal(SNMP) information received from systems on a network in the TRAPD.LOG database structure 208. APPLICATION B 206 is an application program which, for example, manages the associations between objects. As is common in prior designs, the information representing the objects is stored in database 216 while the topological associations are stored separately in database structure 218. As is shown in FIG. 2, only limited sharing of information is possible in prior design due to the independence of the database storage associated with each application program. Application programs 202 and 204 are shown to be sharing the NETWORK DB database 212. Such sharing may occur when multiple application programs are designed by a single vendor or by multiple vendors closely cooperating as discussed above.

Figure 3:
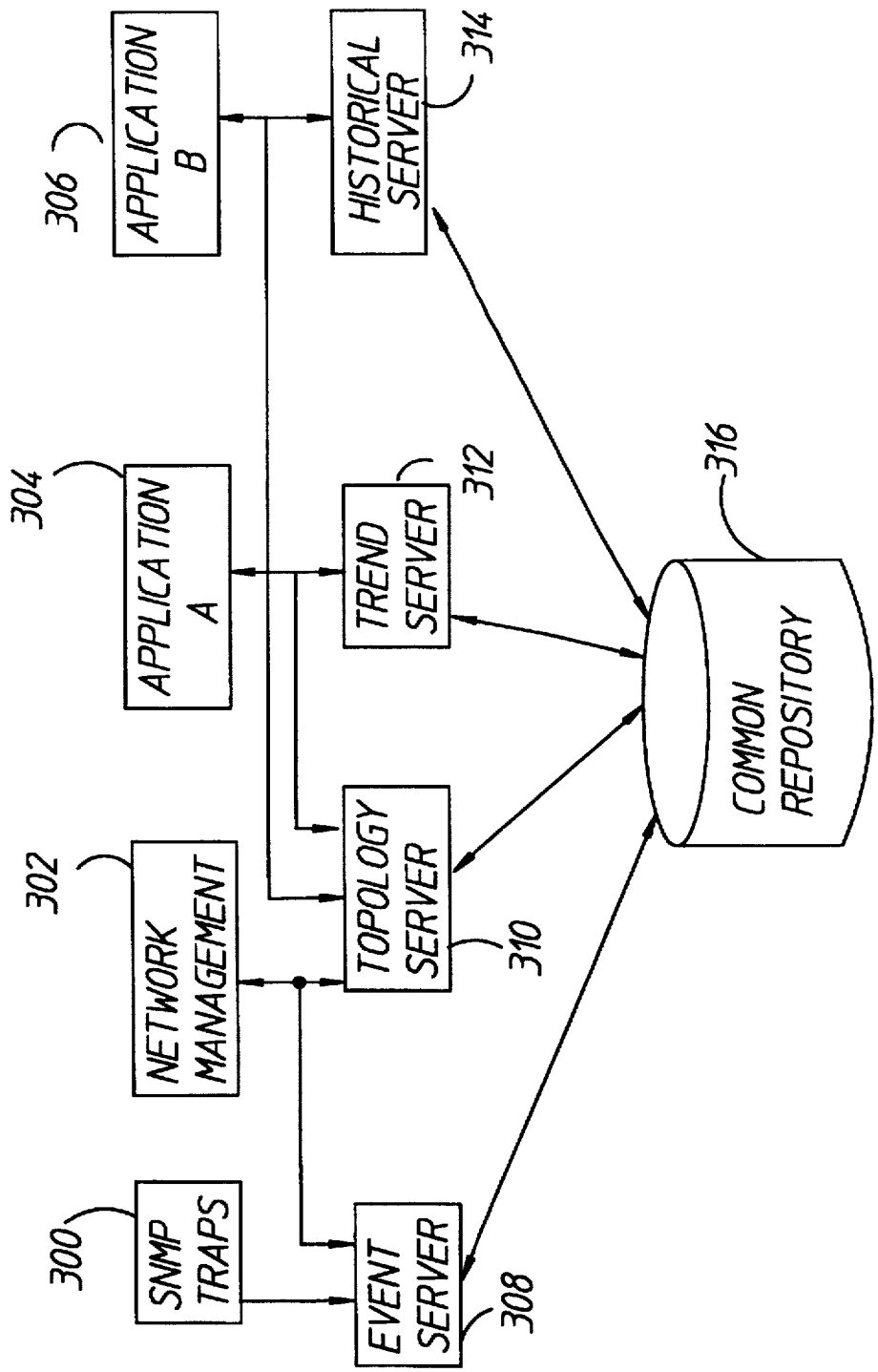
FIG. 3 shows an overview of the structure of application programs structured so as to share information managed by server programs and stored in a common repository in accord with the structure and methods of the present invention.

FIG. 3 shows application programs 300–306 similar to those of FIG. 2 interfaced through server programs 308–314 of the present invention to the common repository 316 of the present invention. In this architecture, all information representing associations between objects is stored in the common repository 316 according to standards defined by the meta-schema. The manipulation of the common repository 316 is performed by standard server programs 308–314. As discussed above, server programs 308–314 are each constructed according to standards including the meta-schema which defines all supported associations between objects in the common repository 316.

Figure 1:
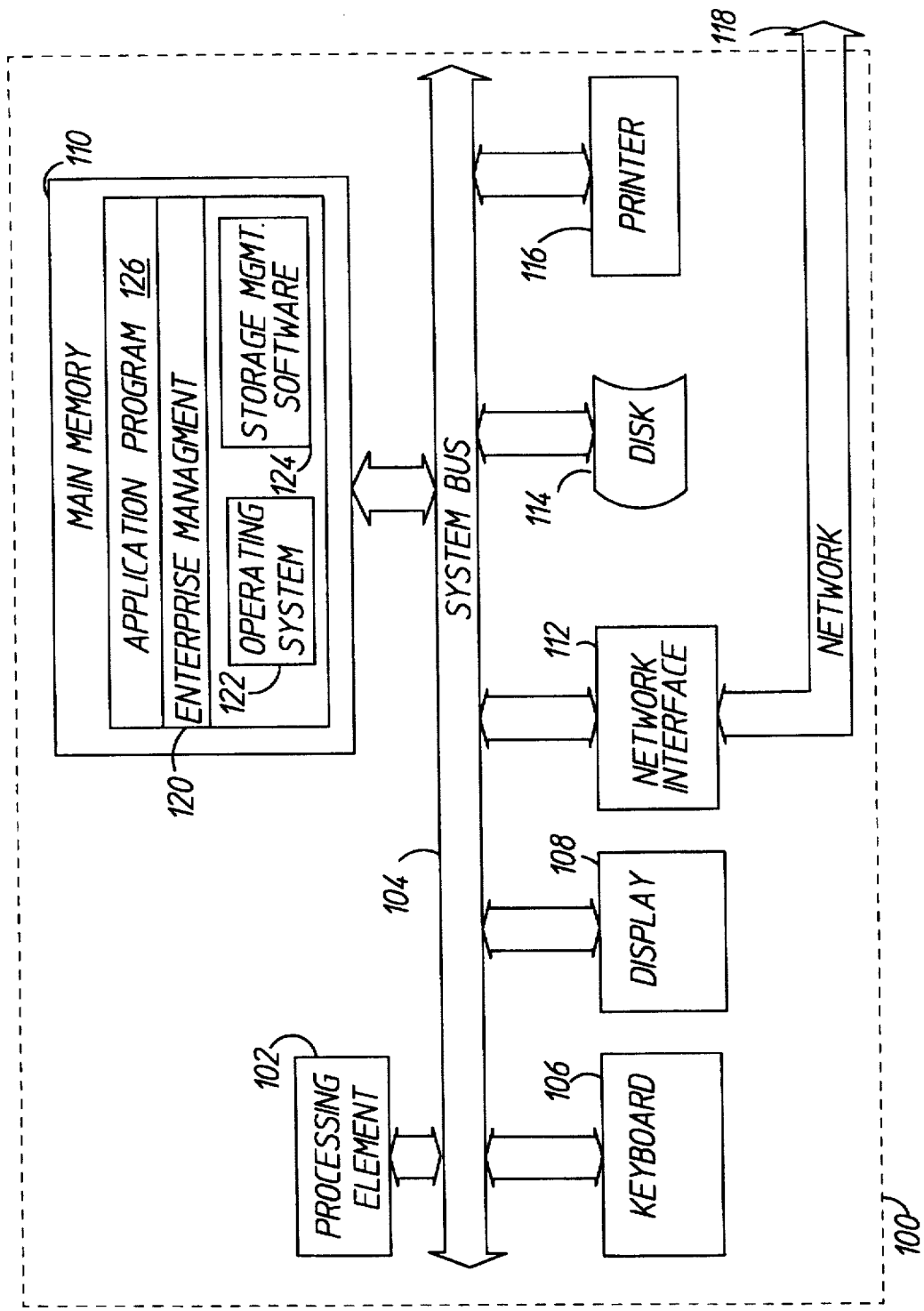
FIG. 1 shows a general purpose data processing system which may embody the structures and methods of the present invention.

FIG. 1 shows a block diagram of the computer hardware that contains the enterprise management services system of the present invention. In FIG. 1, a computer system 100 contains a processing element 102 which communicates to other elements within the computer system 100 over a system bus 104. A keyboard 106 is used to input information from a user of the system, and a display 108 is used to output information to the user. A network interface 112 is used to interface the computer system 100 to a network 118 to allow the computer system 100 to act as a node on a network and to thereby communicate with other nodes on the network. A disk 114 is used to store the software of the enterprise management system of the present invention and to store the information which comprises the common repository 316. A printer 116 can be used to provide a hard copy output of the information managed by the present invention.

A main memory 110 within computer system 100 contains the enterprise management system 120 of the present invention. An application program 126, developed by a user of the present invention communicates with the enterprise management system 120, both of which, in turn, communicate with an operating system 122 and storage management software 124 to perform the enterprise management services on behalf of client application programs. The present invention comprises methods and structures which define the interactions between the application program 126, the enterprise management system 120, and the storage management software 124 to store and manipulate information in a consistent manner to facilitate improved data integrity and improved sharing of information between multiple application programs. Other methods of the present invention aid in the automated generation of application programs 126, server programs within the enterprise management system 120, and database management subsystem (DBMS) schemas to define the structure of information manipulated by the storage management software 124.

The client application programs 126 may operate locally, within computer system 100 or may operate on other computer systems attached to, and communicating over, network 118. It will also be recognized by those of ordinary skill in the art that the information stored in the enterprise common repository 316 may be stored locally on disk 114, or may be stored locally in main memory 110, or may be distributed over other computer systems accessible via network 118, or in any combination of storage devices. More generally, the information stored in the common repository 316 may be stored in any memory device or memory means having suitable capacity and performance characteristics. For example, disk 114 may also be implemented as a collection of memory devices distributed over a plurality of computing systems 100 attached via network 118.

COMMON CLASSES

The present invention includes standard object class definitions called common classes (also referred to herein as object models and object model means) which are utilized by the methods of the present invention. The present invention includes several common class (object model) definitions for many types of objects which are supported in typical enterprise management application programs. The common class definitions are used in two ways by application program developers. First, the common class definition may be used by application programs in conjunction with server programs (discussed below) which manipulate information relating to that class of objects. Second, a server program may define specialized subclasses of the common class object definitions to define special objects to be managed by the server programs and stored in the common repository 316. Such specializations of common classes may provide added detail required by a particular management application program.

Enforcing the common class, or common class subclass definitions on objects stored in the common repository 316 and managed by server programs helps assure that all data stored in the common repository 316 has a consistent organization and that otherwise diverse pieces of data are relatable by an application program. These common classes are interface specifications for object classes which are deemed to be useful to a broad array of application program and server program developers. These specifications encapsulate data which is common to various enterprise management tasks. From these specifications, program developers will implement subclasses which can be used as a basis for more specific classes of objects to be managed in a particular management application. Conversely, application program developers can design application programs which utilize the more general interfaces defined by the common class.

Figure 4:
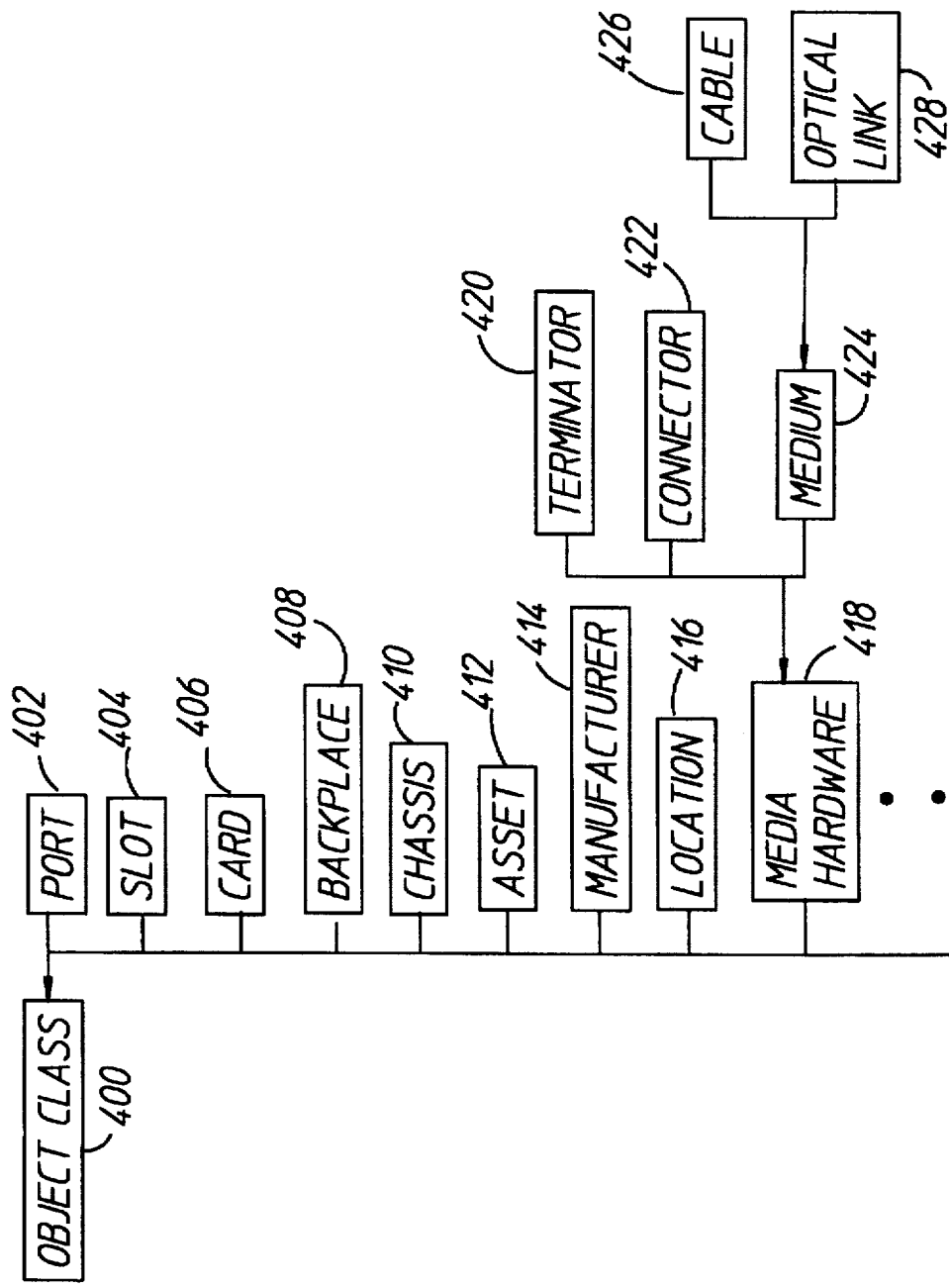
FIG. 4 depicts the class inheritance structure of exemplary common class definitions which reflect physical attributes of an object managed in the common repository of FIG. 3.
Figure 5:
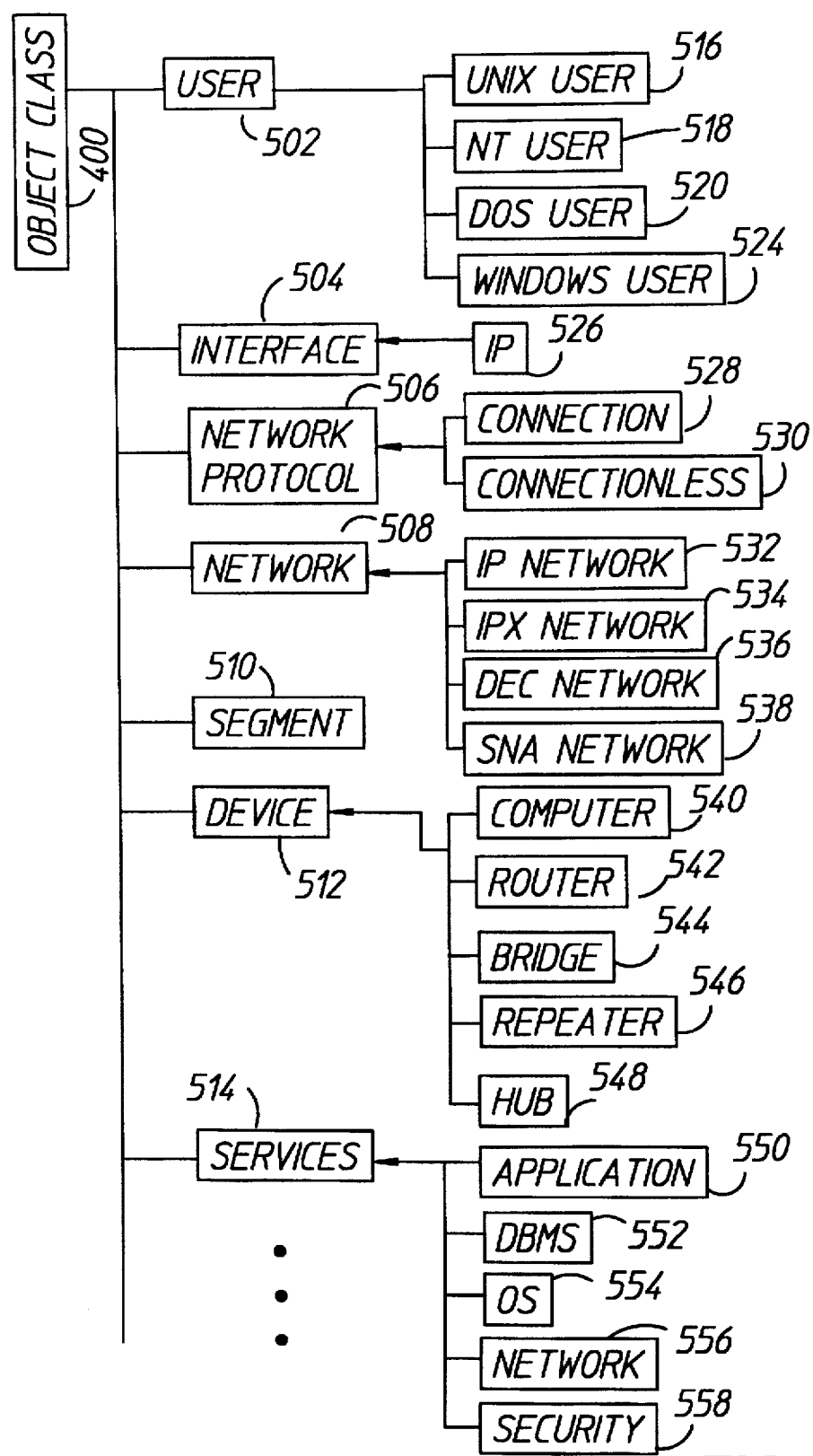
FIG. 5 depicts the class inheritance structure of exemplary common class definitions which reflect logical attributes of an object managed in the common repository of FIG. 3.

FIGS. 4 and 5 depict object class types which are typical of common class definitions for object types whose topological associations are to be managed by a topology server manipulating information in the common repository 316. A topology server is discussed in co-pending U.S. patent application Ser. No. HPDN 1,094,626. The same objects may also be managed by other server programs of the present invention to manipulate the objects on behalf of other application programs.

An object type definition in FIGS. 4 and 5 is indicated by a box labelled with the object type name. If a first object is a specialization of a second object class type, an arrow is directed from the first object type box to the second to indicate it inheritance of the more general object type attributes.

In FIGS. 4 and 5, a general object type labelled OBJECT CLASS 400 is shown. OBJECT CLASS 400 is the most general object type definition for objects which are managed by server programs of the present invention. Examples of several specializations of OBJECT CLASS 400 are shown in FIGS. 4 and 5 which are useful to computing and network management application programs which may in turn utilize the service of the topology (relationship) server program of the present invention.

Object types in FIG. 4 are typical of specialized objects which represent physical aspects of objects to be managed by an asset/inventory management application program. PORT 402, SLOT 404, CARD 406, BACKPLANE 408, and CHASSIS 410 are examples of specialized object types, derived from OBJECT CLASS 400, which are useful to application programs designed for management of network and computing resources. Other exemplary object types 412–428 of FIG. 4 are useful for application programs which manage other topological associations among objects or attributes thereof. Object types TERMINATOR 420, CONNECTOR 422, and MEDIUM 424 are specializations of the object type MEDIA HARDWARE 418. These specialization object types are defined for the specific needs of one or more application programs which require specific knowledge of different types of MEDIA HARDWARE 418 objects. Similarly, object types CABLE 426 and OPTICAL LINK 428 are specializations of the MEDIUM 424 object type to provide further detail as to objects which identify different types of interconnection media.

Object types depicted in FIG. 5 are further examples of specialized objects useful in a hypothetical enterprise management application program. The object types of FIG. 5 represent logical characteristics of objects manipulated by a server program on behalf of a management application program. USER 502, INTERFACE 504, and NETWORK PROTOCOL 506 object types, as well as object types 508–558 of FIG. 5, are examples of object types managed by a server program on behalf of a hypothetical enterprise management application program.

The object type depicted in FIGS. 4 and 5 are not intended to limit the object types definable as common class objects. Rather, the object types of FIGS. 4 and 5 are intended only as examples means to suggest the types of objects which may be usefully managed by one exemplary server program of the present invention, a topology server.

META-SCHEMA

The types of objects managed as defined by the common classes (and specializations thereof) and the types of managed information associated with managed objects is defined by the meta-schema of the present invention. The purpose of the meta-schema is to define standard structure for the storage of management information in the common repository 316 of the present invention. In addition, the meta-schema provides a framework for the standard semantic interpretation of the management information associated with managed objects managed by the server programs of the present invention.

The purpose of the meta-schema is to define standard structure for the storage of information associated with managed objects in the common repository 316. This standardized structure permits improved integration of otherwise disparate management application programs by assuring that similar information is stored in similar ways.

Management data which is shared by disparate application programs through the standard structure and semantics of the meta-schema includes:

Topology—information which describes associations between managed objects,

Attribute—basic information about a managed object which describes attributes of the object which are of interest to one or more application programs, Historical and trend—information used by application programs which is used to record historical changes in the managed object and to detect trends in parameters associated with the managed object, and Notification—information which relates to events of relevance to multiple objects and multiple application programs.

The meta-schema defines standard structures for storing this information and associating the information with a managed object. The meta-schema comprises a number of database schema definitions for tables which store the above types of management data. Fields in each of the tables defined by the schemas are associated with an atomic data type including:

Numeric—including integer, fixed point decimal, and floating point numbers represented in various levels of precision, Boolean—indicating TRUE or FALSE Date—indicating a date in an implementation dependent format, Timestamp—indicating elapsed time in seconds since Jan. 1, 1970, Enumerated—indicating one of a finite set of mutually exclusive values (often represented as an integer with a limited range of legal values), Character—representing a fixed length string of bytes, Varchar—representing a variable length string of bytes, and UUID—a value which is generated as a universally unique ID.

Using these atomic data types, the standard representation of management information may be defined as database schemas.

TOPOLOGY SCHEMAS

A topology is a collection of specific topological associations among a selected set of managed objects. These topological associations are managed by a topology service program. The topological associations reveal how objects are related to one another. For example, which managed objects contain other managed objects and how managed objects are connected to one another. The topology service, strictly speaking, does not contain the managed objects themselves. Rather, the topology is the information which describes the associations between the managed topological objects and merely refers to the managed objects indirectly.

The topology schemas achieve the following goals:

1. The ability to represent any collection of manageable objects, regardless as to whether physical or logical in nature (as discussed above with reference to FIGS. 4 and 5), and regardless of the actual objects and topologies represented (i.e. networks, systems, services, etc.).
2. Allow for the representation of completely arbitrary collections of objects (i.e. wherein the criteria by which a set of objects are associated with another set cannot necessarily be deduced from the object attributes stored and managed in the common repository 316).
3. Allow for objects to simultaneously belong to multiple, possibly independent, sets of topological associations.
4. Allow for multiple types of topological associations between managed objects, including, for example: containment, connectivity, and dependency.

Figure 6:
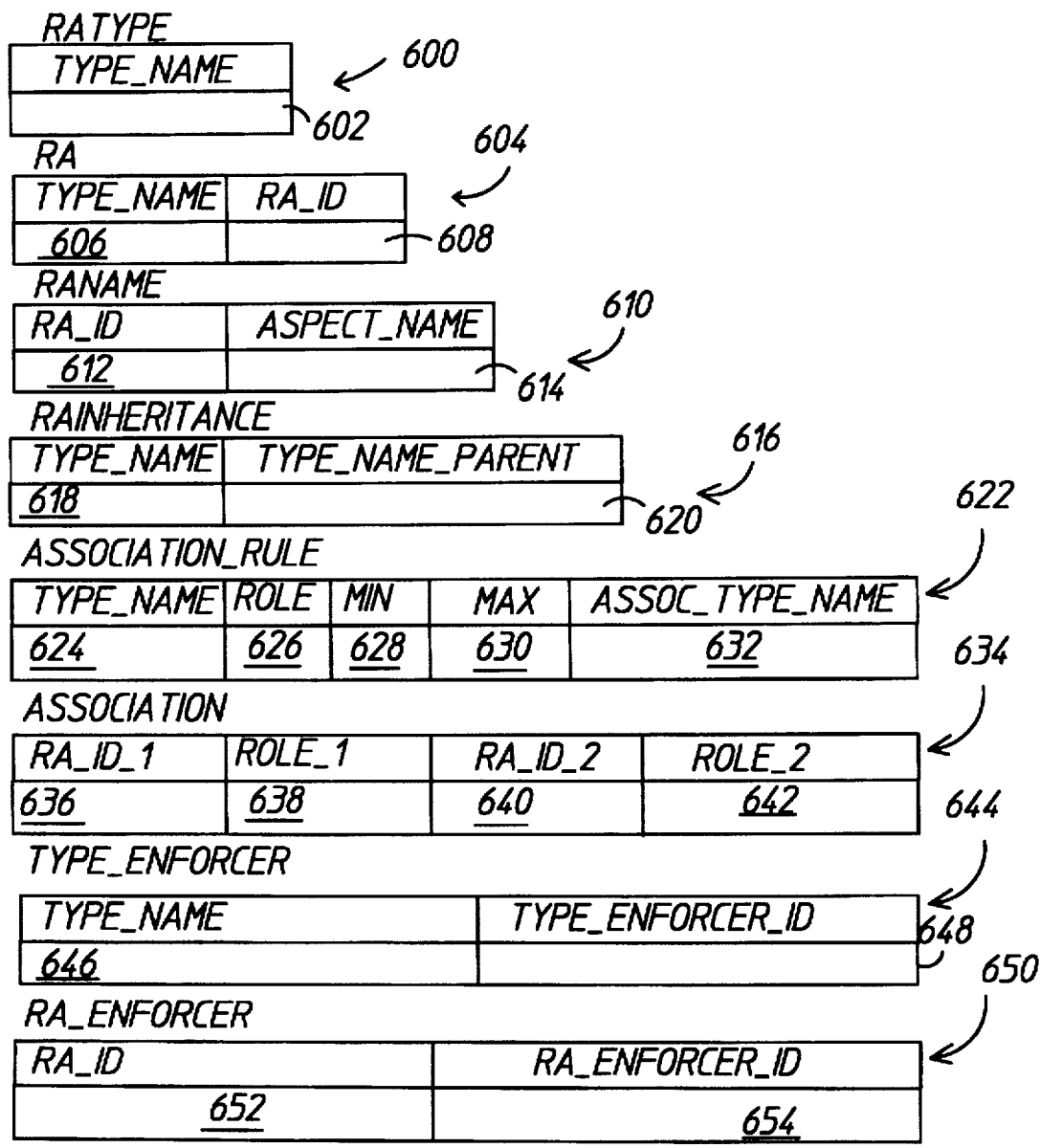
FIG. 6 shows the structure of tables for storing relationships between managed objects in accord with the meta-schema of the common repository of FIG. 3.

A common service in enterprise management is the management of topological information. As used herein, topological information relates to the relationships between managed objects. Such topological information is often presented in a graphical form to reflect hierarchical and other associations between managed objects. In modeling associations among objects as described herein, the topological aspects of the objects are referred to as resources or resource aspects. The relationships among the resources are referred to as associations. The common repository database schemas of the present invention define the standard structure of topological information managed by server programs of the present invention. FIG. 6 depicts how the tables defined by the topology schemas are organized.

RATYPE table

An RATYPE table 600 of FIG. 6 contains the name of each defined resource aspect type. Entries in other tables are keyed to this type name and thereby associated with the particular defined resource aspect type.

Each entry in an RATYPE table 600 contains a type_name attribute 602 which uniquely identifies the resource aspect type in the common repository 316. The attributes of the containment table 620 are defined as follows:

| Attribute name | Description | Type | Index |
| --- | --- | --- | --- |
| type_name | field which identifies a particular resource aspect type | Varchar | Key |

Other tables discussed below are keyed to the type_name attribute 602 found in the RATYPE table 600 entries.

RA table

An RA table 604 of FIG. 6 contains information describing specific instances of topological objects of a particular resource aspect type. Such specific instances are referred to herein as resource aspects. Each entry in an RA table 604 contains a type_name attribute 606, and an ra_id attribute 608. The type_name attribute 606 identifies the resource aspect type of the resource aspect instance. The ra_id attribute 608 uniquely identifies the resource aspect as an object in the common repository 316. The attributes of the RA table 604 are defined as follows:

| Attribute name | Description | Type | Index |
| --- | --- | --- | --- |
| type_name | field identifying the resource aspect type of the resource aspect | Varchar | Key |
| ra_id | object identifier of the managed resource aspect | UUID | Key |

RANAME table

An RANAME table 610 of FIG. 6 contains information describing user supplied names associated with a particular resource aspect instance. Each entry in an RANAME table 610 contains an ra_id attribute 612, and an aspect_name attribute 614. The ra_id attribute 612 uniquely identifies the resource aspect with which the RANAME entry is associated. The aspect_name attribute 614 is a user supplied name by which the resource aspect is identified. The aspect_name attribute 614 is used by topology management server programs to identify resource aspects which, in fact, refer to the same resource as named by the user. The attributes of the RANAME table 610 are defined as follows:

| Attribute name | Description | Type | Index |
| --- | --- | --- | --- |
| ra_id | object identifier of the managed resource aspect | UUID | Key |
| aspect_name | user supplied identifier for the resource aspect | Varchar | Key |

RAINHERIANCE table

An RAINHERITANCE table 616 of FIG. 6 contains information describing which resource aspect types are parents of each resource aspect type. In object oriented class definitions, a class definition inherits all attributes of its parents. Each resource aspect type defined in the RATYPE table 600 has zero or more parent entries identified in the RAINHERITANCE table 616. Each entry in the RAINHERITANCE table 616 contains a type_name attribute 618, and a type_name_parent attribute 620. The type_name attribute 618 identifies the resource aspect type for which the entry defines a parent type. The type_name_parent attribute 620 identifies the parent resource aspect type of the entry from which the entry inherits other attributes. The attributes of the RAINHERITANCE table 616 are defined as follows:

| Attribute name | Description | Type | Index |
| --- | --- | --- | --- |
| type_name | field identifying the resource aspect type of the inheritance entry | Varchar | Key |
| type_name_parent | field identifying the resource aspect type of the parent of the resource aspect type of the inheritance record | Varchar | Key |

ASSOCIATION_RULE table

An ASSOCIATION_RULE table 622 of FIG. 6 contains information describing rules for the formation of associations for each resource aspect type. Resource aspects of a particular resource aspect type may form associations with resource aspects according to the rules defined by entries in the ASSOCIATION_RULE table 622 entries. Each entry in the ASSOCIATION_RULE table 622 contains a type_ name attribute 624, a role attribute 626, a min attribute 628, a max attribute 630, and an assoc_type_name attribute 632. The type_name attribute 624 identifies the resource aspect type for which the entry defines an association rule. The role attribute 626 identifies the user defined role of the resource aspect type in forming an association according to the defined rule. The min attribute 628 and the max attribute 630 define the minimum and maximum number of associations which may be formed by a resource aspect of the identified type with other resource aspects. The assoc_type_name attribute 632 identifies the resource aspect type of the other resource aspect with which the resource aspect of the identified resource aspect type may associate according to the defined rule. The attributes of the ASSOCIATION_RULE table 622 are defined as follows:

| Attribute name | Description | Type | Index |
| --- | --- | --- | --- |
| type_name | field identifying the resource aspect type of the association rule | Varchar | Key |
| role | entry identifier for the role which the identified resource aspect fulfills in forming the defined association | Varchar | Key |
| min | minimum number of associations the identified resource aspect type must form according to this rule | Numeric | |
| max | maximum number of associations the identified resource aspect type may form according to this rule | Numeric | |
| assoc_type_name | field identifying the resource aspect type of the resource aspect type with which the defined association must be formed | Varchar | Key |

ASSOCIATION table

An ASSOCIATION table 634 of FIG. 6 contains information describing associations actually formed between two resource aspects. Each entry in the ASSOCIATION table 634 contains an ra_id_1 attribute 636, a role_1 attribute 638, an ra_id_2 attribute 640, and a role_2 attribute 642. The ra_id_1 attribute 636 identifies the first of the two resource aspects which participate in the association while the ra_id_2 attribute 640 identifies the other. The role_1 attribute 638 and role_2 attribute 642 identify the user defined role of ra_id_1 and ra_id_2, respectively, in forming the association. The attributes of the ASSOCIATION table 634 are defined as follows:

| Attribute name | Description | Type | Index |
| --- | --- | --- | --- |
| ra_id_1 | object identifier of the first managed resource aspect participating in the association | UUID | Key |
| role_1 | identifier for the role which the first identified resource aspect fulfills in the defined association | Varchar | Key |
| ra_id_2 | object identifier of the second managed resource aspect participating in the association | UUID | Key |
| role_2 | identifier for the role which the second identified resource aspect fulfills in the defined association | Varchar | Key |

TYPE_ENFORCER table

A TYPE_ENFORCER table 644 of FIG. 6 contains information describing enforcer information associated with a particular resource aspect type. The enforcer is a method of defining additional rules in the creation and modification of the topological information. Rules beyond the simpler rules defined by the ASSOCIATION_RULE table 622 entries may be added to a resource aspect type by entries in this table. Each entry in a TYPE_ENFORCER table 644 contains a type_name attribute 646, and a type_enforcer_id attribute 648. The type_name attribute 646 uniquely identifies the resource aspect type with which the TYPE_ENFORCER entry is associated. The type_enforcer_id attribute 648 is a user supplied object identifier used to invoke the enforcer when changes are made to the topological information. The attributes of the TYPE_ENFORCER table 644 are defined as follows:

| Attribute name | Description | Type | Index |
| --- | --- | --- | --- |
| type_name | field identifying the resource aspect type of the resource aspect | Varchar | Key |
| type_enforcer_id | user supplied identifier for the enforcer object | UUID | Key |

RA_ENFORCER table

An RA_ENFORCER table 650 of FIG. 6 contains information describing enforcer information associated with a particular resource aspect. The enforcer is a method of defining additional rules in the creation and modification of the topological information. Rules beyond the simpler rules defined by the ASSOCIATION_RULE table 622 entries may be added to a resource aspect by the entries in this table. Each entry in an RA_ENFORCER table 650 contains a ra_id attribute 652, and an ra_enforcer_id attribute 654. The ra_id attribute 652 uniquely identifies the resource aspect with which the RA_ENFORCER entry is associated. The ra_enforcer_id attribute 654 is a user supplied object identifier used to invoke the enforcer when changes are made to the topological information. The attributes of the RA_ENFORCER table 650 are defined as follows:

| Attribute name | Description | Type | Index |
| --- | --- | --- | --- |
| ra_id | object identifier of the managed resource aspect | UUID | Key |
| ra_enforcer_id | user supplied identifier for the enforcer object | UUID | Key |

Managed object schemas

The topology schemas discussed above define standard structure and semantics for the storage and management of topological association information in the common repository 316. The topology information does not explicitly store the objects which are associated with one another. Rather, the objects are referred to only indirectly by reference to an object id attribute value representative of the stored object stored and managed elsewhere in the common repository 316 of the present invention.

Figure 7:
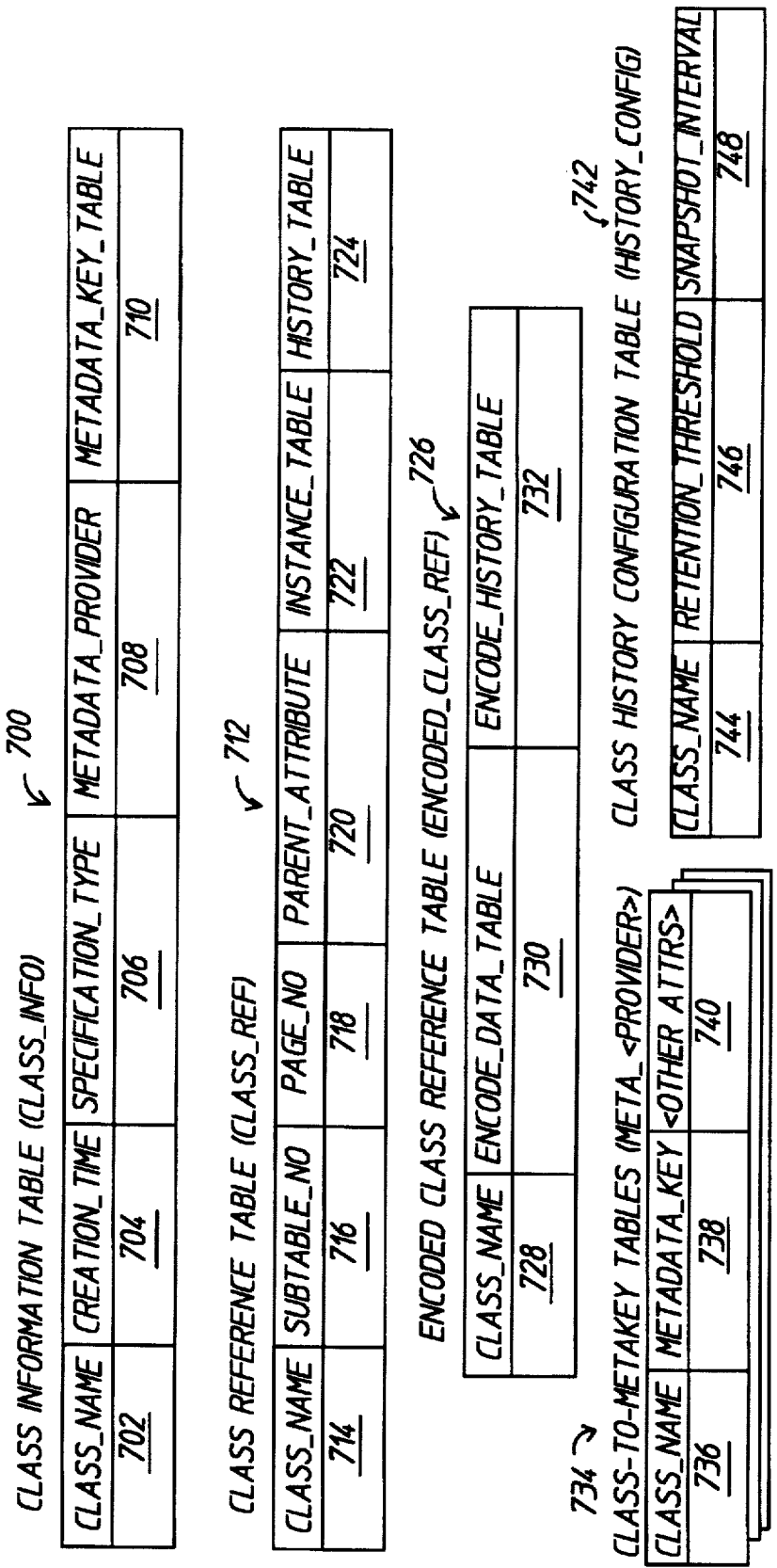
FIG. 7 shows the structure of tables for storing class definitions of managed objects in accord with the meta-schema of the common repository of FIG. 3.
Figure 8:
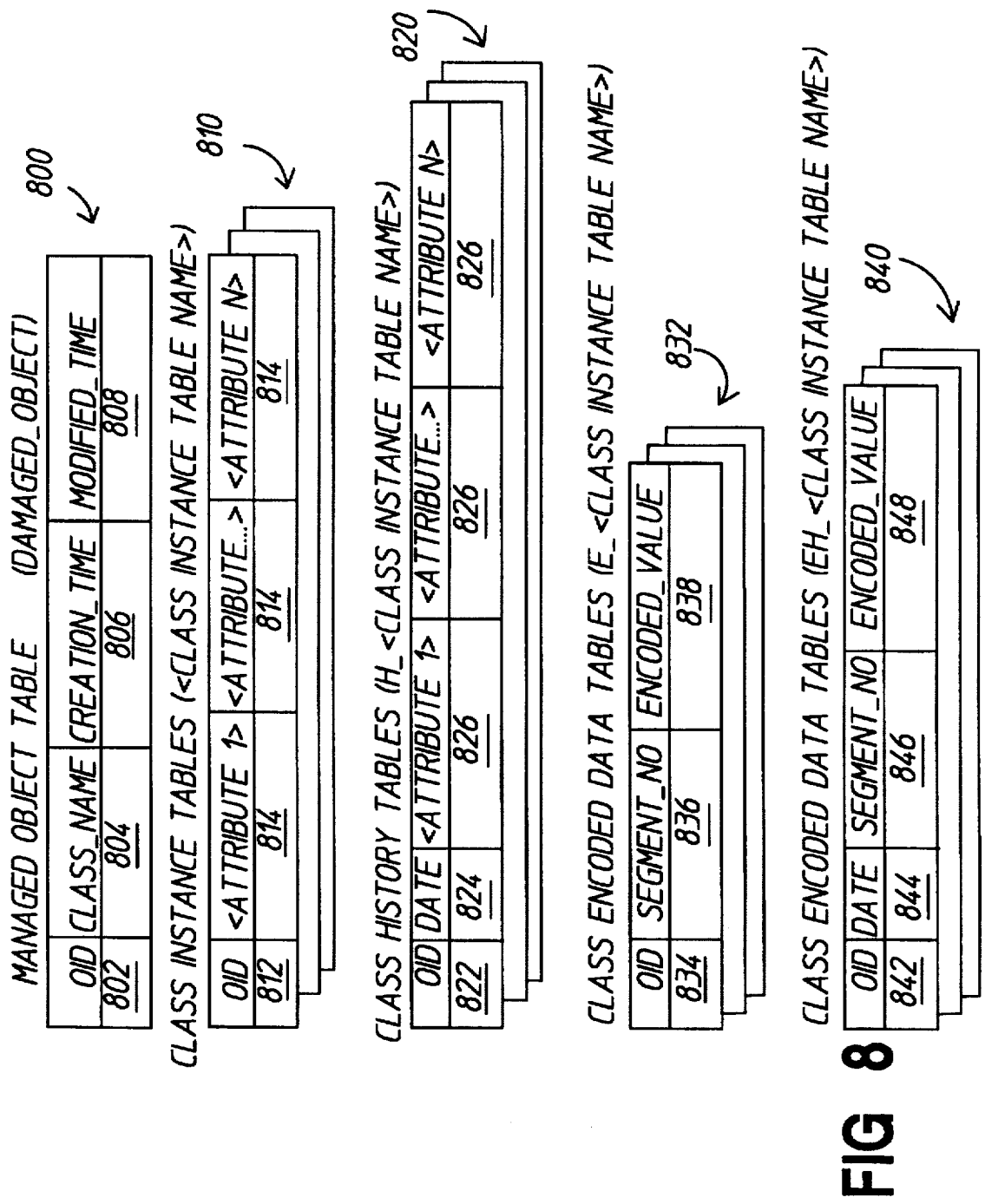
FIG. 8 shows the structure of tables for storing object instance specific attribute information for managed objects in accord with the meta-schema of the common repository of FIG. 3.

Objects managed by the structures and methods of the present invention are stored according to schemas which define standard structures for the storage of object attributes as well as historical, event, and trend information relating to the objects. The schemas which define the information and related structure for storing and managing objects are generally divided into two broad groups: class definition schemas and object instance schemas. The class definition schemas are depicted in FIG. 7 discussed below and define structure for storage of information which describes an object type class and, therefore, information which applies to all objects of that object type class. The object instance schemas are depicted in FIG. 8 discussed below and define structure for storage of information unique to a particular instance of an object of a particular object type class.

Class definition schemas

FIG. 7 depicts the general layout of schemas which define the structure of tables storing information about object type classes. The schema definitions depicted in FIG. 7 represent a union of many structures defined in alternative standards for object type class schema definition. Specifically the schemas of FIG. 7 incorporate features of object class definition languages including Guidelines for the Definition of Managed Objects (GDMO), Common Object Request Broker Architecture Interface Definition Language (CORBA IDL), and Concise Management Information Base (Conscise MIB). The GDMO object class definition language is defined by the International Telegraph and Telephone Consultative Committee (CCITT). Recommendation X.722/ ISO/ITU 10165-4:1991 INFORMATION TECHNOLOGY—OPEN SYSTEMS INTERCONNECTION STRUCTURE OF MANAGEMENT INFORMATION—PART 4: GUIDELINES FOR DEFINITION OF MANAGED OBJECTS. The CORBA IDL object class definition language is defined by the Object Management Group, Inc. (located at: Framingham Corporate Center, 492 Old Connecticut Path, Framingham, Mass. 01701, and hereinafter referred to as OMG) and is documented in standard OMG publications as well as in X/Open Company's COMMON OBJECT REQUEST BROKER: ARCHITECTURE & SPECIFICATION (X/Open® Computer Aided Engineering (CAE) Specification C432 ISBN 1-85912-044-X—was previously publication P210, available from X/Open Company Ltd, Berks, United Kingdom, and hereinafter referred to as the CORBA specification). Concise MIB is defined by the Internet Engineering Task Force (IETF)—Network Working Group—RFC1212.

Class information table

All classes of objects managed by the present invention have an entry in the class information table 700. Each entry in the class information table 700 has a class_name attribute 702, a creation_time attribute 704, a specification_type attribute 706, a metadata_provider attribute 708, and a metadata_key_table attribute 710. The class_name attribute 702 uniquely identifies the class definition entry in the class information table 700. The creation_time attribute 704 stores the time of creation of the class definition entry. The specification_type identifies the standard specification language used to define the class as described above. The present invention accommodates Concise MIB, GDMO, CORBA IDL, and other specification types. The metadata_provider attribute 708 and metadata_key_table attribute 710 identify information required to interact with a process or entity which provides further information to define the class. The attributes of the class information table 700 are defined as follows:

| Attribute name | Description | Type | Index |
| --- | --- | --- | --- |
| class_name | textual name of the class | Varchar | Key |
| creation_time | date that the class was created | Date | |
| specification_type | type of the specification tool used to define the class | Enumerated | |
| metadata_provider | name of entity which defined the class | Varchar | |

-continued

| Attribute name | Description | Type | Index |
| --- | --- | --- | --- |
| metadata_key_table | name of class-to-metadata-key table for this class name and metadata_provider combination | Varchar | |

Class reference table

Entries in the class reference table 712 of FIG. 7 reference all tables that contain attribute values for a given class. Some class definitions require multiple tables to store their various attribute values for objects. One cause of this is very large class definitions whose combined attribute types extend beyond the per-entry storage limits of a particular database management subsystem which underlies the common repository 316 structure and methods of the present invention. Another cause for multiple tables to define a class derives from constructs used in certain class definitions which require additional tables to define the class. For example, the "SEQUENCE OF" and "SET OF" constructs in the GDMO specification language and the "Tables" construct in the Concise MIB definition language represent a list of values. Each time one of these constructs is encountered or when a lengthy class definition exceeds the per-entry length of the underlying database management subsystem, a subtable is required to store the data in the construct.

The class reference table 712 has an entry for every subtable required to describe a particular class. All entries in the class reference table have a class_name attribute 714, a subtable_no attribute 716, a page_no attribute 718, a parent_attribute attribute 720, an instance_table attribute 722, and a history_table attribute 724. The class_name attribute 714 identifies the class for which this entry represent a subtable. The attributes of the class reference table 712 are defined as follows:

| Attribute name | Description | Type | Index |
| --- | --- | --- | --- |
| class_name | textual name of the class | Varchar | Key |
| subtable_no | a sequential count of subtable, the first is set to 1 | Numeric | Key |
| page_no | page number for attribute sets which exceed per-entry length, initially set to 0 for new subtable, incremented for each additional page of a subtable | Numeric | Key |
| parent_attribute | if subtable_no >1, this identifies the parent attribute containing the SET OF, SEQUENCE OF or Table of attributes | Varchar | |
| instance_table | name of the table containing the attribute values for this subtable attribute set | Varchar | |
| history_table | name of the history table of attribute values, if any, corresponding to the subtable attribute set | Varchar | |

Class history configuration table

Entries in the class history configuration table 742 contain information regarding configuration data related to objects belonging to the corresponding class. Some common class objects store historical records of configuration data to log changes in configuration over time. Each entry in the class history configuration table 742 has a class_name attribute 744, a retention_threshold attribute 746, and a snapshot_interval attribute 748. The class_name attribute 744 of each entry identifies the class definition to which the configuration history entry belongs. The retention_threshold attribute 746 indicates the duration of time for which the entry is valid, after which it may be purged. The snapshot_interval attribute 748 indicates the regular period of time for which a new entry is to be created by appropriate management application or server programs of the present invention. The attributes of the class history configuration table 742 are defined as follows:

| Attribute name | Description | Type | Index |
|---|---|---|---|
| class_name | textual name of the class | Varchar | Key |
| retention_threshold | Age beyond which entry may be purged | Timestamp | |
| snapshot_interval | minimum time interval between creation of new entries | Numeric | |

Encoded class reference table

Entries in the encoded class reference table 726 contain complex object type class related information in an encoded form to improve efficiency of manipulation and to reduce storage requirements within the common repository 316 of the present invention. Each entry in the encoded class reference table comprises a class_name attribute 728, an encode_data_table attribute 730, and an encode_history_table attribute 732. The class_name attribute 728 of each entry identifies the class definition to which the encoded class reference entry belongs. The encode_data_table attribute 730 contains the name of another table with encoded data for the object class type. The encode_history_table attribute 732 contains the name of another table with encoded history information for the object type class. The attributes of the encoded class reference table 726 are defined as follows:

| Attribute name | Description | Type | Index |
|---|---|---|---|
| class_name | textual name of the class | Varchar | Key |
| encode_data_table | name of table containing encoded data | Varchar | |
| encode_history_table | name of table containing encoded history | Varchar | |

Class-to-metakey table

Entries in the class-to-metakey table 734 contain information which provides access to metadata for the identified object class type definition. This information is typically provided, if at all, by server programs which make metadata available from the class definition specifications. Each entry in the class-to-metakey table has a class_name attribute 736, a metadat_key attribute 738, and other attributes 740. The class_name attribute 728 of each entry identifies the class definition to which the encoded class reference entry belongs. The metadata_key attribute 738 and the other attributes 740 provide implementation specific information appropriate to the form of metadata provided by the class definition tools and the related server programs. The attributes of the class history configuration table 726 are defined as follows:

| Attribute name | Description | Type | Index |
|---|---|---|---|
| class_name | textual name of the class | Varchar | Key |
| metadata_key | key to access provider of metadata | | |
| other attributes | other provider specific attributes | | |

Object instance schemas

FIG. 8 depicts the general layout of schemas which define the structure of tables storing information about specific instances of an object type class (i.e. specific objects of a particular type class).

Managed object table

Entries in the managed object table 800 contain identification information for managed objects stored in the common repository 316 and managed by application and server programs. There is at least one entry in the managed object table 800 for each object stored and managed by the present invention. Each entry in the managed object table has an oid attribute 802, a class_name attribute 804, a creation_time attribute 806, and a modified_time attribute 808. The oid attribute 802 identifies the object which corresponds to the managed object entry. The class_name attribute 804 identifies the object type class to which the managed object belongs. The creation_time attribute 806 and modified_time attribute 808 store the time of creation and last modification of the managed object, respectively. If an object belongs to more than one object type class then there are multiple entries in the managed object table with the same oid attribute 802 but different class_name attributes 804. The attributes of the managed object table 800 are defined as follows:

| Attribute name | Description | Type | Index |
|---|---|---|---|
| oid | object identifier of the object | UUID | Key |
| class_name | instance textual name of the class | Varchar | Key |
| creation_time | time at which the object instance was created | Date | |
| modification_time | time of last modification of the object instance | Timestamp | |

Class instance table

Entries in the class instance table 810 consist of information relating object instances which belong to the object type class with which the table is associated. Each class instance table 810 is referenced by the instance_table attribute 722 of the class reference table 712 discussed above with reference to FIG. 7. Each entry in the class instance table 810 has an oid attribute 812, and a variable number of other attributes 814. The oid attribute 812 identifies the object which corresponds to the class instance entry. The variable number of other attributes 814 are specific to the object instance represented by the class instance table entry. The attributes of the class instance tables 810 are defined as follows:

| Attribute name | Description | Type | Index |
|---|---|---|---|
| oid | object identifier of the object instance | UUID | Key |
| other attributes | other attributes specific to the object instance | | |

Class history tables

Entries in the class history tables 820 consist of historical attribute values of object instances which belong to the object type class with which the table is associated. Each class history table 820 is referenced by the history_able attribute 724 of the class reference table 712 discussed above with reference to FIG. 7. Each entry in the class history table 820 has an oid attribute 822, a date attribute 824, and a variable number of other attributes 826. The oid attribute 822 identifies the object which corresponds to the class history entry. The variable number of other attributes 826 are specific to the object instance represented by the class history table entry. The attributes of the class history tables 820 are defined as follows:

| Attribute name | Description | Type | Index |
|---|---|---|---|
| oid | object identifier of the object instance | UUID | Key |
| date | date at which object instance had the following attribute values | Date | Key |
| other attributes | other attributes specific to the object instance | | |

Class encoded data tables

Entries in the class encoded data tables 832 consist of encoded information relating to object instances which belong to the object type class with which the table is associated. Each class encoded data table 832 is referenced by the encode_data_table attribute 730 of the encoded class reference table 726 discussed above with reference to FIG. 7. Each entry in the class encoded data table 832 has an oid attribute 834, a segment_no attribute 836, and a variable number of other attributes represented as encoded_value attribute 838. The oid attribute 834 identifies the object which corresponds to the class encoded data entry. The segment_no attribute 836 indicates which portion of the encoded attributes are represented by this entry (if the encoded_value attribute 838 exceeds the length permitted for a single entry). The variable number of other attributes in encoded_value attribute 838 are specific to the object instance represented by the class encoded data table entry. The attributes of the class encoded data tables 832 are defined as follows:

| Attribute name | Description | Type | Index |
|---|---|---|---|
| oid | object identifier of the object instance | UUID | Key |
| segment_no | segment number of this portion of the encoded_value if its total length exceeds one entry's maximum length | Numeric | Key |
| encoded_value | other attributes specific to the object instance in an encoded form | | |

Class encoded history table

Entries in the class encoded history tables 840 consist of encoded historical attribute values relating to object instances which belong to the object type class with which the table is associated. Each class encoded history table 840 is referenced by the encode_history_table attributed 732 of the encoded class reference table 726 discussed above with reference to FIG. 7. Each entry in the class encoded history table 840 has an oid attribute 842, a date attribute 844, a segment_no attribute 846, and a variable number of other attributes represented as encoded_value attribute 848. The oid attribute 842 identifies the object which corresponds to the class encoded history entry. The segment_no attribute 846 indicates which portion of the encoded attributes are represented by this entry (if the encoded_value attribute 848 exceeds the length permitted for a single entry). The variable number of other attributes in encoded_value attribute 848 are specific to the object instance represented by the class encoded history table entry. The attributes of the class encoded history tables 840 are defined as follows:

| Attribute name | Description | Type | Index |
|---|---|---|---|
| oid | object identifier of the object instance | UUID | Key |
| date | the date at which this object had these encoded attribute values | Date | Key |
| segment_no | segment number of this portion of the encoded_value if its total length exceeds one entry's maximum length | Numeric | Key |
| encoded_value | other attributes specific to the object instance in an encoded form | | |

Historical Trend Schemas

Figure 9:
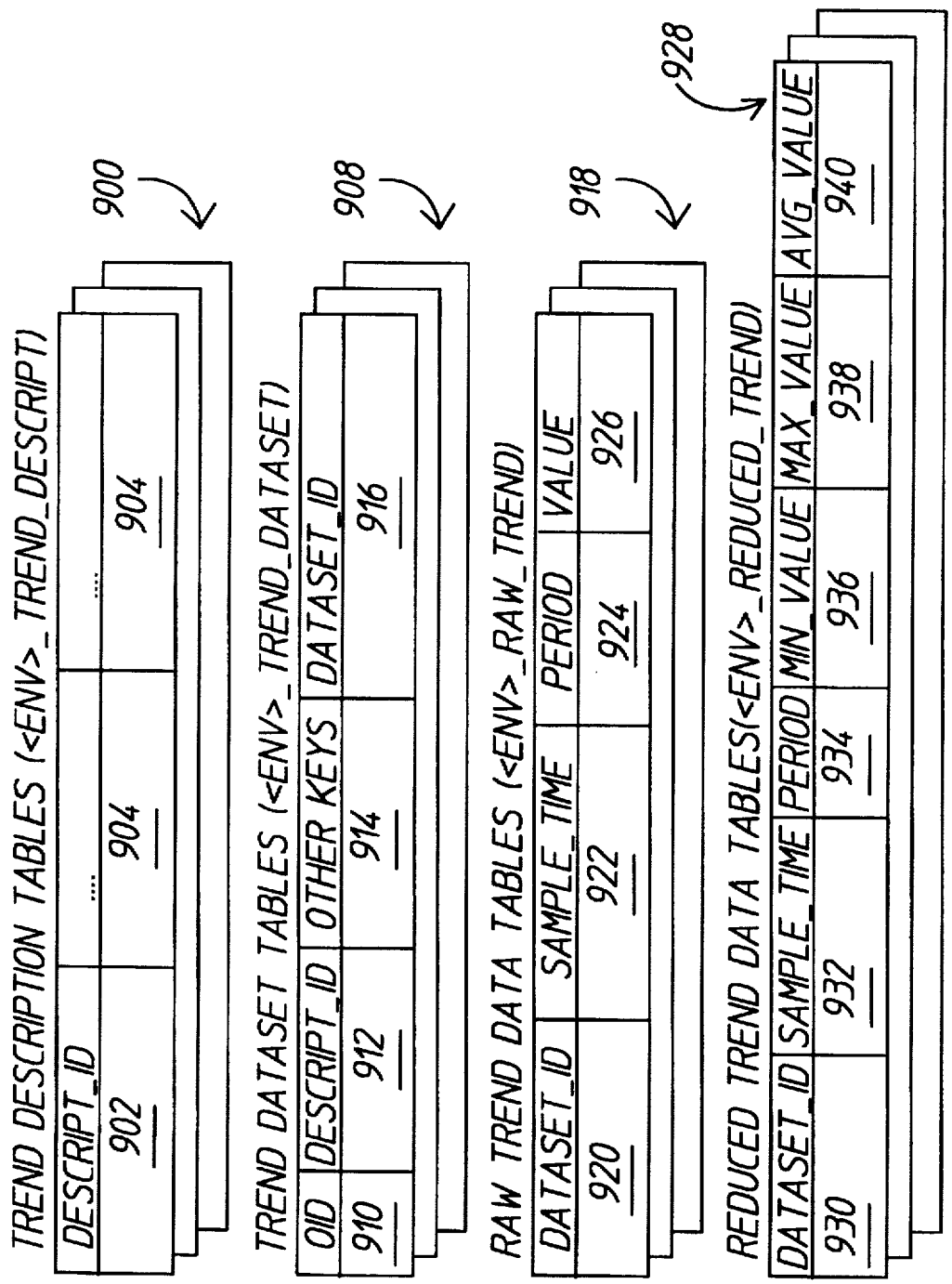
FIG. 9 shows the structure of tables for storing object trend analysis information for managed objects in accord with the meta-schema of the common repository of FIG. 3.

Historical trend schemas are depicted in FIG. 9 and define structure for the storage of data collected over time which is related to managed objects stored in the common repository 316 of the present invention. Application and server programs manipulate the trend data to perform required management analysis tasks. The schemas depicted in FIG. 9 for the collection of trend data are intended only as exemplary embodiments of normalized schemas organized for the collection and retrieval of such data. In certain management tasks it is necessary to insert and retrieve trend data very rapidly due to data rates associated with the particular object instance related to the trend data. In such circumstances, application and server programs may require adaptation of more specialized schemas better tuned to the particular performance or capacity goals of the particular object.

The trend data schemas depicted in FIG. 9 consist of four interrelated tables. The trend description tables 900 describe the measurements (i.e. variables) to be monitored. The trend dataset tables 908 describe the data set or data streams for which the variables are to be measured. The last two tables, raw trend data tables 918 and reduced trend data tables 928, store the actual trend data measured by server programs and stored for further analysis by application programs.

Trend description tables

Entries in the trend description tables 900 define the variables to be measured for a particular trend analysis. Each trend description table entry has a descript_id attribute 902 and a variable number of other attributes 904. The descript_id attribute 902 is a unique id generated by the application programs which utilize the trend data to identify a particular variable to be measured. The other attributes 904 are unique to the particular trend analysis application and server programs which defined the variable to be measured. The attributes of the trend description tables 900 are defined as follows:

| Attribute name | Description | Type | Index |
|---|---|---|---|
| descript_id | a unique identifier for this trend variable | Numeric | Key |
| ... attributes ... | other attributes specific to the measured variable | | |

Trend dataset tables

Entries in trend dataset tables 908 contain information to map a trend description table 900 entry and an object to a specific data set identifier into which the measured data is stored. Each entry in the trend dataset table 908 has an oid attribute 910, a descript_id attribute 912, a dataset_id attribute 916, and other_attributes 914 unique to the particular object and/or variable being monitored. The oid attribute 910 identifies an object instance (described above with respect to FIG. 8) to be monitored for purposes of collecting trend data. The descript_id attribute 912 identifies the data to be gathered from the identified object. The descript_id attribute 912 corresponds to an entry in the trend description tables 900 described above. The dataset_ id attribute 916 uniquely identifies the data set tables which store the collected date gathered from the identified object with respect to the identified trend description variable. The attributes of the trend dataset tables 908 are defined as follows:

| Attribute name | Description | Type | Index |
|---|---|---|---|
| oid | identifier of the managed object to be monitored | UUID | Key |
| descript_id | identifier for the trend variable to be monitored | Numeric | Key |
| other_attributes | other attributes unique to the specific variable or object being monitored | | |
| dataset_id | a unique identifier of the dataset tables in which to collect trend data | Numeric | |

Raw trend data tables

Entries in the raw trend data tables 918 contain the actual data collected by monitoring the identified trend description variable with respect to the identified object. Each entry in the raw trend data tables 918 has a dataset_id attribute 920, a sample_time attribute 922, a period attribute 924, and a value attribute 926. All entries having the same value for the dataset_id attribute 920 are part of the dataset identified by the corresponding trend dataset table 908 described above. The sample_time attribute 922 indicates the time at which the measurement ended. The period attribute 924 indicates the length of the time period over which the measurement was taken. The value attribute 926 indicates the value of the identified measurement. The attributes of the raw trend data tables 918 are defined as follows:

| Attribute name | Description | Type | Index |
|---|---|---|---|
| dataset_id | identifier of this dataset | Numeric | Key |
| sample_time | time at which this measurement ended | Timestamp | Key |
| period | length of time period of this measurement | Numeric | |
| value | value of this measurement | Numeric | |

Reduced trend data table

The reduced trend data table 928 contains identical attributes to the raw trend data table 918 described above but replaces the value attribute 926 with reduced values computed from the raw values measured in the raw data table 918 described above. Each entry in the reduced trend data tables has a dataset_id attribute 930, a sample_time attribute 932, a period attribute 934, a min value attribute 936, a max_value attribute 938 and an avg_value attribute 940. All entries having the same value for the dataset_id attribute 930 are part of the dataset identified by the corresponding trend dataset table 908 described above. The sample_time attribute 932 indicates the time at which the measurement ended. The period attribute 934 indicates the length of the time period over which the measurement was taken. The min_value attribute 936, max_value attribute 938, and avg_value attribute 940 indicate the minimum, maximum, and average values, respectively, of the measured variable of the identified object. The attributes of the reduced trend data tables 930 are defined as follows:

| Attribute name | Description | Type | Index |
|---|---|---|---|
| dataset_id | identifier of this dataset | Numeric | Key |
| sample_time | time at which this measurement ended | Timestamp | Key |
| period | length of time period of this measurement | Numeric | |
| min_value | minimum value of this measurement over the specified period | Numeric | |
| max_value | maximum value of this measurement over the specified period | Numeric | |
| avg_value | average value of this measurement over the specified period | Numeric | |

SNMP trend data example

The trend data schemas described above with respect to FIG. 9 may be better understood with the aid of an example. SNMP is a well known network management protocol used to manage and monitor network configuration and performance. The following tables describe the trend data related tables as applied to the monitoring of a typical SNMP measurement.

SNMP trend description table

| Attribute name | Description | Type | Index |
|---|---|---|---|
| descript_id | a unique identifier for this trend variable | Numeric | Key |
| mib_oid | SNMP MIB variable object identifier | Varchar | Key |
| units | units of measure of the monitored variable | Varchar | |
| title | title for this SNMP MIB variable | Varchar | |
| descript | description for this SNMP MIB variable | Varchar | |

SNMP trend dataset table

| Attribute name | Description | Type | Index |
|---|---|---|---|
| oid | identifier of the managed object to be monitored | UUID | Key |
| descript_id | identifier for the trend variable to be monitored | Numeric | Key |
| instance | the instance of the SNMP MIB object id | Numeric | Key |
| dataset_id | a unique identifier of the dataset tables in which to collect trend data | Numeric | |

The raw trend data and reduced trend data tables for the above described SNMP trend data example are as described above with respect to FIG. 9.

SERVER PROGRAMS AND DEVELOPMENT TOOLS

The methods of the present invention include standard server programs to manipulate the common repository 316 of the present invention. All information stored in the common repository 316 adheres to the structure of the meta-schema as defined above. The standard server programs of the present invention provide services on behalf of management client application programs. Only server programs directly store, retrieve, and manipulate the information pertaining to managed objects in the common repository 316. Application programs requiring storage, retrieval, or manipulation of information request such services from a server program appropriate to the information request. This helps assure the integrity and consistency of the information relating to managed objects in the common repository 316. The mechanisms by which an application program (often referred to as a client) communicates with a server program are a matter of design choice by the implementor of the present invention. Several standard techniques are well known to those of ordinary skill in the art.

The standard servers provided by the present invention include a topology service (as discussed in co-pending U.S. patent application Ser. No. HPDN 1,094,626), a trend data collection and reduction service to measure and record data relating to particular aspects of managed objects, and a historical attribute service to record a history of changes in attributes of managed objects stored in the common repository 316. Many client application programs may be constructed using these standard service programs in conjunction with the data structures defined by the meta-schema.

When a particular application program requires retrieval or manipulation of information in the common repository 316 which is not supported by the standard server programs, the present invention permits development of new server programs by a software developer. Tools provided in the present invention accept a high level, object oriented class definition of the information to be manipulated by a management application program. The object oriented class definition is provided in the form of a preliminary IDL language description. The IDL language is specified in the X/OPEN CORBA document discussed above.

A server generation development tool of the present invention receives the preliminary IDL object class definition and creates a database schema for the underlying database management subsystem used by the methods of the present invention to store and retrieve information regarding the newly defined object class. The database schema is constructed according to the standards defined by the meta-schema described above. Information relating to the new object class will be stored and retrieved according to the structure imposed by the database schema definition. The database schema is in turn constructed according to the dictates of the meta-schema structure. This construction of the underlying database schema aids in enforcing the desired integrity and consistency of the information stored and manipulated in the common repository 316.

In addition, the server generation development tool generates a working skeleton of the source code for a server program to perform basic manipulations of the objects defined by the preliminary IDL language. The server program source code generated is "skeletal" in the sense that it performs only the basic functions of creating, destroying, updating, and retrieving information associated with the objects defined by the preliminary IDL object class definition. Further application specific or sophisticated manipulation of the newly defined objects is left to the development engineers. If only the basic functions discussed above are required, then the "skeletal" server program generated by the server program development tool is complete and functional.

The newly generated server program, when functional, helps assure the integrity and consistency of the manipulation of information and objects stored in the common repository 316. The generated server program adheres to, and enforces the standard structures for storage defined by the meta-schema. Application programs access information regarding the newly defined objects stored in common repository 316 only by requesting supported services through server programs generated in accord with the meta-schema and IDL object class type definitions.

This structure enables integration of information among otherwise disparate management application programs. All information stored in the common repository 316 adheres to the structure defined by the meta-schema discussed above. Integrity and consistency of the information stored is improved over past designs because standardized data constructs are manipulated only by standardized server programs.

Figure 10:
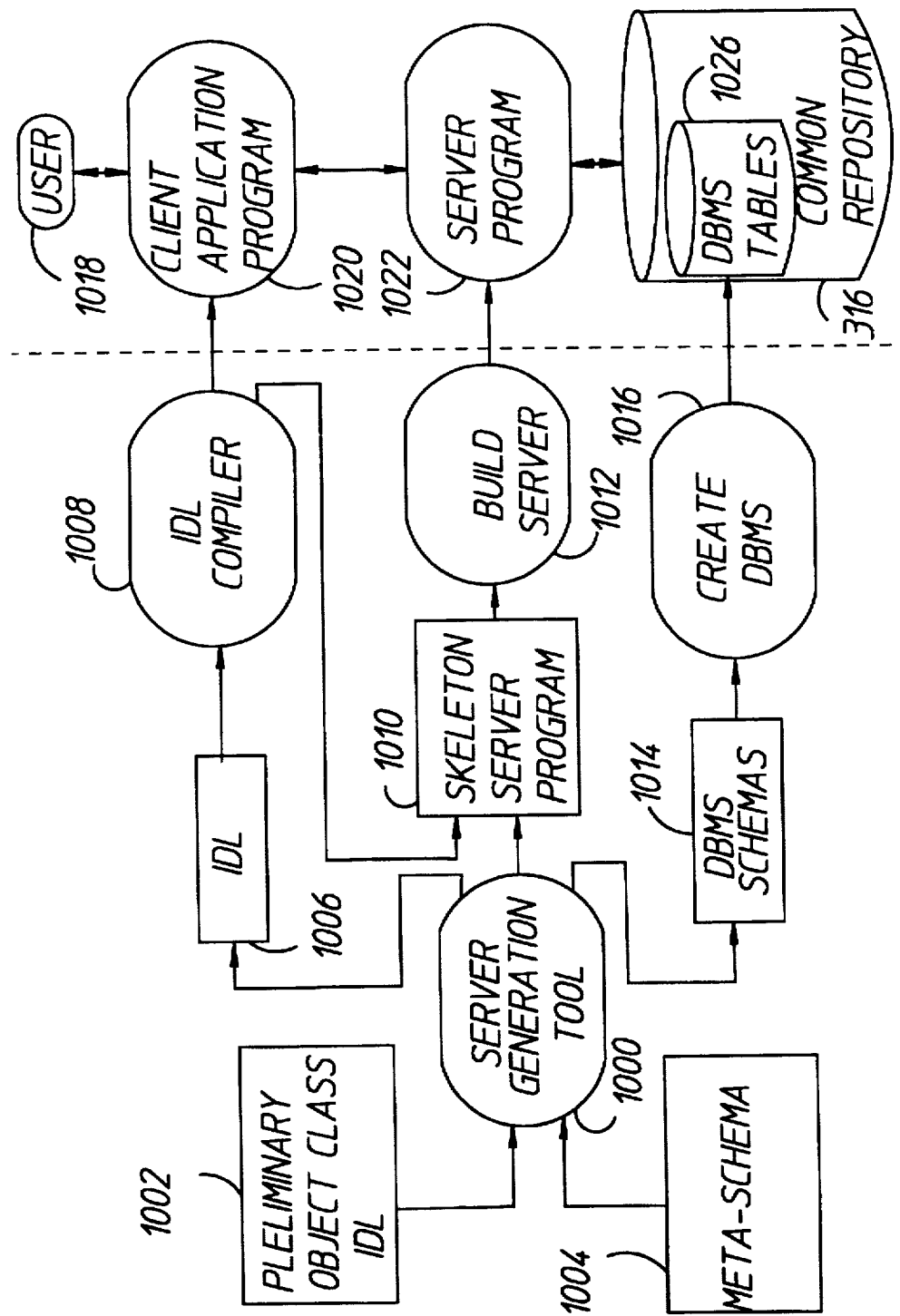
FIG. 10 shows the general flow of information in operation of the server program generation tool of the present invention for creating new server programs to manipulate objects stored in the common repository of FIG. 3.

FIG. 10 shows the flow of information in the operation of the server program generation tool. Server generation tool 1000 accepts as input the preliminary object class IDL 1002. Server generation tool 1000 implicitly utilizes the meta-schema 1004 in processing the IDL 1002 input. The preliminary object class IDL 1002 specifies the object attributes and associated functions. Server generation tool 1000 generates three pieces of information as output for further processing, IDL 1006, skeleton server program 1010, and DBMS schema 1014.

IDL 1006 is an adaptation of the preliminary object class IDL 1002 which is modified by server generation tool 1000 to adhere to the constructs and rules defined by the meta-schema 1004. The adapted IDL 1006 is used as input by a standard IDL language compiler 1008 to generate source code segments for a client application program 1020 and for a skeleton server program 1010. IDL language compiler 1008 may be any of several standard IDL compilers commercially available. Release 1.3 of the SUNSOFT OMG IDL Compiler Front End (CFE) available from the Object Management Group (address supplied above) is typical of such an IDL compiler tool for creating source code segments from an IDL language specification of an object class.

Skeleton server program 1010 is produced by the combined source code segments output from server generation tool 1000 and IDL compiler 1008. The skeleton server program 1010 is applied as input to the build server 1012 process which creates the actual executable server program 1022. Build server 1012 process is typically a standard source code compiler such as a C++ compiler provided with most UNIX® workstations.

DBMS schemas 1014 are produced by server generation tool 1000 and applied as input to the create DBMS 1016 process. The create DBMS 1016 process is supplied as a component of the underlying database management system which physically stores the information managed within the common repository 316. The actual DBMS tables 1026 are created by the create DBMS 1016 process and adhere to the structure dictated by the meta-schema 1004.

The application developer utilizes the elements 1000–1016 on the left side of the dashed vertical line.

There has been described methods and structure for a common repository to share management information. It should be understood that the particular embodiments shown in the drawings and described within this specification are for purposes of example and should not be construed to limit the invention which will be described in the claims below. Further, it is evident that those skilled in the art may now make numerous uses and modifications of the specific embodiments described, without departing from the inventive concepts. For example, the data constructs described herein could be implemented in a variety of well known software data structures. Furthermore, the methods described herein could be modified to manipulate a variety of data structures for storing information. Or equivalent structures and processes may be substituted for the various structures and processes described. Consequently, the invention is to be construed as embracing each and every novel feature and novel combination of features present in, or possessed by, the methods and structure described.

What is claimed is:

1. A computer based data management system for managing information regarding objects, each object belonging to an object class and utilized by application programs; said data management system comprising:

memory means for storing said information;

a meta-schema for defining standard structures for storing said information managed by said system in said memory means, said information comprising attributes of said objects and relationships between said objects;

a plurality of integrated server programs for servicing requests received by said plurality of integrated server programs from said application programs to manipulate said information regarding objects stored in said memory means in accordance with the standard structures defined by said meta-scheme and in accordance with standard object class definitions; and server program generation means, independent of the application programs, but cooperative with said meta-schema and standard object class definitions, for generating additional ones of said server programs and integrating said additional ones of said server programs with said plurality of integrated server programs so as to maintain information integrity within the memory means and reduce unintended duplication of information within the memory means.

2. The data management system of claim 1 wherein said server program generation means is responsive to said meta-schema to control the structure of server programs generated by said server program generation means.

3. The data management system of claim 1 further comprising:

database schema generation means for generating database schemas used by said server programs and by said application programs to manipulate information stored in said memory means.

4. The data management system of claim 3 wherein said database schema generation means is responsive to said meta-schema to control the structure of said database schemas generated by said database schema generation means.

5. A computer based data management method for managing information regarding objects, each belonging to an object class and utilized by application programs; said data management method comprising the steps of:

(a) providing a memory means for storing said information;

(b) providing a meta-schema;

(c) defining, according to the meta-schema, standard structures for storing said information managed by said method in said memory means, said information comprising attributes of said objects and relationships between said objects;

(d) providing an object model;

(e) defining, according to the object model, standard object classes of objects utilized by said application programs according to the structure defined by said meta-schema;

(f) providing a plurality of integrated server programs;

(g) operating said server programs to service application program requests to manipulate said information regarding objects stored in said memory means in accordance with the standard structures provided by said meta-schema and in accordance with the standard object class definitions;

(h) generating additional ones of said server programs, independently of the application programs, but cooperatively with said meta-schema and with said standard object class definitions; and (i) integrating said additional ones of said server programs with said plurality of integrated server programs so as to maintain information integrity within the memory means and reduce unintended duplication of information within the memory means.

6. The data management method of claim 5 wherein the server program generation step is responsive to said meta-schema to control the structure of server programs generated by said server program generation means.

7. The data management method of claim 5 further comprising the step of:

generating database schemas used by said server programs and by said application programs to manipulate information stored in said memory means.

8. The data management method of claim 7 wherein the database schema generation step is responsive to said meta-schema to control the structure of the generated database schemas.

9. In a computer based environment comprising multiple application programs needing access to information stored in a common repository, access to the common repository being provided via a database management system, apparatus for ensuring that information in the common repository is stored and manipulated in a consistent manner, thereby facilitating improved data integrity and improved sharing of information between the multiple application programs, comprising:

a) a meta-schema defining rules and constructs pertaining to storage and manipulation of information stored in the common repository;

b) a plurality of integrated server programs through which all of the multiple application programs gain access to the database management system, each server program providing access, via the database management system, to a particular managed aspect of information stored in the common repository, each server program adhering to the rules and constructs of the meta-schema;

c) means for generating:

i) additional server programs, said additional server programs being integrated with the plurality of integrated server programs, said additional server programs providing access, via the database management system, to additional managed aspects of information stored in the common repository, and said additional server programs adhering to the rules and constructs of the meta-schema:

ii) DBMS schemas, said DBMS schemas adhering to the rules and constructs of the meta-schema; and iii) code segments, adhering to the rules and constructs of the meta-schema, which can be incorporated into one or more application programs which require access, via the additional server programs and the database management system, to the additional managed aspects of information stored in the common repository; and d) means for incorporating the DBMS schemas into DBMS tables of the database management system.

10. Apparatus for developing new server programs when it is determined that an application program requires storage or manipulation of information in a common repository which is not supported by standard server programs, comprising:

a) a server generation tool having an input for accepting a preliminary object class definition of information to be manipulated by an application program; an input for accepting a meta-schema; and outputs for generating, in response to its inputs, database (DBMS) schemas for the information to be manipulated; an IDL which adheres to the constructs and rules defined by the meta-schema; and first source code segments for a server program to perform basic manipulations of objects defined by the preliminary object class definition;

b) an IDL compiler having an input for accepting the IDL; and an output for generating second source code segments for a server program to perform basic manipulations of objects defined by the preliminary object class definition; and c) a build server process which compiles the first and second source code segments for a server program to create an executable server program.

11. Apparatus as in claim 10, wherein the preliminary IDL object class definition is compiled by the IDL compiler to generate source code segments to be integrated into an application program to access the executable server program.

12. Apparatus as in claim 10, wherein the first and second source code segments for a server program only provide for creating, destroying, updating and retrieving information.

13. In a system wherein application programs access information stored in a common repository via defined, integrated server programs, a method of providing an application program with access to information in the common repository which is not supported by the defined server programs, the method comprising the steps of:

a) generating an IDL, a skeleton server, and DBMS schemas in response to a preliminary object class IDL and standards defined by a meta-schema;

compiling the IDL;

c) generating an executable server from the compiled IDL and the skeleton server;

d) creating a DBMS from the DBMS schemas; and e) providing, via the executable server, access to the information in the common repository which is not supported by the defined server programs.

* * * * *